United States Patent
Sadowara

(10) Patent No.: US 11,381,704 B2
(45) Date of Patent: Jul. 5, 2022

(54) IMAGE READING APPARATUS AND PROGRAM READING A FIRST SURFACE AND A SECOND SURFACE OF A SHEET AND DETECTING A FIRST IMAGE AT A FIRST EDGE AND A SECOND IMAGE AT A SECOND EDGE OF A SHEET IF A DOUBLE FEED OF A SHEET IS DETECTED IN ORDER TO COMBINE FIRST IMAGE DATA AND SECOND IMAGE DATA OF THE FIRST AND SECOND IMAGES IF A DOUBLE FEED IS DETECTED

(71) Applicant: TOSHIBA TEC KABUSHIKI KAISHA, Tokyo (JP)

(72) Inventor: Tetsuya Sadowara, Mishima Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/090,215

(22) Filed: Nov. 5, 2020

(65) Prior Publication Data

US 2021/0234987 A1    Jul. 29, 2021

(30) Foreign Application Priority Data

Jan. 23, 2020  (JP) .............. JP2020-009085

(51) Int. Cl.
*H04N 1/387* (2006.01)
*H04N 1/203* (2006.01)
(Continued)

(52) U.S. Cl.
CPC ....... *H04N 1/2032* (2013.01); *H04N 1/00572* (2013.01); *H04N 1/00748* (2013.01); *H04N 1/3876* (2013.01)

(58) Field of Classification Search
CPC ............. H04N 1/2032; H04N 1/00572; H04N 1/00748; H04N 1/3876; H04N 1/3877; H04N 1/387; G06T 7/30
(Continued)

(56) References Cited

U.S. PATENT DOCUMENTS 5,452,105 A * 9/1995 Tamagaki ............ H04N 1/3876
                                                       358/448
5,644,411 A    7/1997 Tamagaki et al.
(Continued)

FOREIGN PATENT DOCUMENTS

EP    0920189 A2   6/1999
JP    H1175016 A   3/1999
(Continued)

OTHER PUBLICATIONS

Extended European Search Report dated Apr. 12, 2021, mailed in counterpart European Application No. 20213308.8, 30 pages.

*Primary Examiner* — Chad Dickerson
(74) *Attorney, Agent, or Firm* — Kim & Stewart LLP

(57) ABSTRACT

An image reading apparatus includes a reading unit and a controller. The reading unit reads a first image on a first surface of a sheet and a second image on a second surface of the sheet and generates first and second image data, respectively. The controller determines, based on the first and second image data, whether the first image is at a first edge of the first surface and the second image is at a second edge of the second surface of the sheet. The controller combines the first and second image data into combined image data corresponding to the first and second images if both the first image is at the first edge and the second image is at the second edge. The controller processes the combined image data such that a combined image corresponding to the combined image data has a predetermined size.

15 Claims, 10 Drawing Sheets

(51) Int. Cl.
*H04N 1/00* (2006.01)
*G06F 3/12* (2006.01)

(58) Field of Classification Search
USPC ............... 358/450, 453, 448, 452, 474, 462; 382/167, 199
See application file for complete search history.

(56) References Cited

U.S. PATENT DOCUMENTS

| | | | |
|---|---|---|---|
| 5,708,513 | A | 1/1998 | Hasuo et al. |
| 6,549,681 | B1 * | 4/2003 | Takiguchi ............ H04N 1/3876 382/284 |
| 9,531,897 | B2 * | 12/2016 | Yu ......................... H04N 1/3878 |
| 2016/0094755 | A1 | 3/2016 | Shimahashi et al. |
| 2016/0156794 | A1 * | 6/2016 | Yoda .................. H04N 1/00572 358/450 |

FOREIGN PATENT DOCUMENTS

| | | | |
|---|---|---|---|
| JP | 2005286921 A | * | 10/2005 |
| JP | 2010154112 A | * | 7/2010 |
| JP | 2010154112 A | | 7/2010 |
| JP | 2010160611 A | | 7/2010 |

* cited by examiner

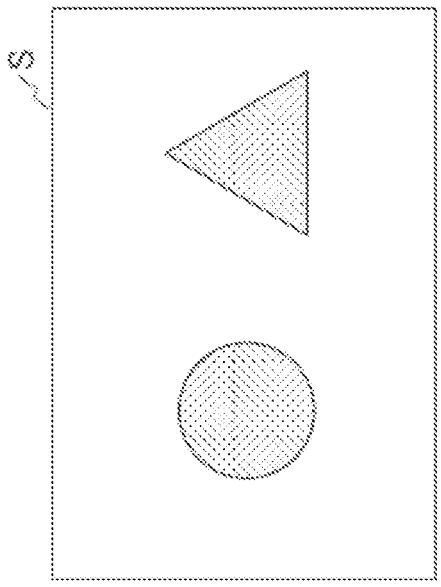
FIG. 10A
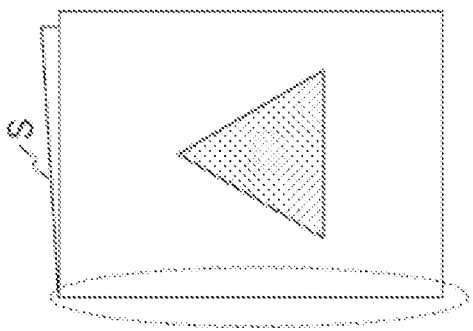
FIG. 10B
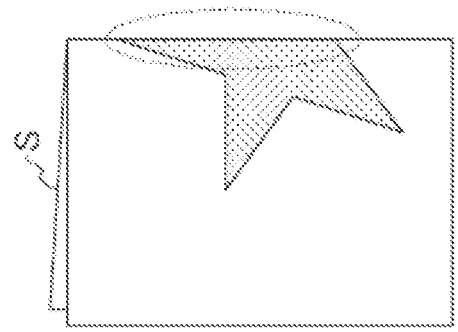
FIG. 10C
FIG. 10D

IMAGE READING APPARATUS AND PROGRAM READING A FIRST SURFACE AND A SECOND SURFACE OF A SHEET AND DETECTING A FIRST IMAGE AT A FIRST EDGE AND A SECOND IMAGE AT A SECOND EDGE OF A SHEET IF A DOUBLE FEED OF A SHEET IS DETECTED IN ORDER TO COMBINE FIRST IMAGE DATA AND SECOND IMAGE DATA OF THE FIRST AND SECOND IMAGES IF A DOUBLE FEED IS DETECTED

CROSS-REFERENCE TO RELATED APPLICATIONS

This application is based upon and claims the benefit of priority from Japanese Patent Application No. 2020-009085, filed on Jan. 23, 2020, the entire contents of which are incorporated herein by reference.

FIELD

Embodiments described herein relate generally to an image reading apparatus and an image reading program.

BACKGROUND

An image reading apparatus is configured to read an image formed on a sheet such as a paper, a label paper, and the like. Examples of an image reading apparatus include a device such as a scanner, a copier, a multifunction peripheral (MFP), and the like. Generally, the maximum size of a sheet that can be read by the image reading apparatus is fixed. Such an image reading apparatus cannot read an image on a sheet of a size larger than the maximum readable size of the image reading apparatus.

However, there is a technique by which an oversized sheet can be folded or split into a pair of sheets to fit within the maximum readable size and an image reading apparatus may be configured to read images from a folded or split sheet, and the original oversized image can be obtained by combining (re-combining) the read images with each other. For example, in a case where an A3-size sheet having an original image formed thereon has been folded in two (for example, folded in half) so that each surface across the fold has an A4 size, the image reading apparatus can read images which appear on both front and back sides of the folded A3-size sheet (which is now, effectively, two A4-size sheets), generate image data corresponding to the read images and combine the image data to generate (re-generate) the original A3-size image.

In a case where a sheet to be read is not a folded sheet, the image reading apparatus does not need to perform the combining of the image data to restore an original, larger image. As such, in advance of performing image reading processing, the image reading apparatus may require a user to designate whether the sheet about to be read is a folded sheet or not. When reading is to be performed on several sheets including both folded sheets and unfolded sheets, a manual designation by a user may be required for each new sheet to be read. This makes the image reading operation inconvenient and inefficient for a user.

Hence, there is a need for an image reading apparatus and an image reading program that improves convenience and efficiency where a sheet to be read by the image reading apparatus includes a folded or otherwise split-type sheet.

BRIEF DESCRIPTION OF THE DRAWINGS

FIGS. 10A, 10B, 10C and 10D depict example sheets according to an embodiment.

DETAILED DESCRIPTION

According to one or more embodiments, an image reading apparatus includes a reading unit and a controller. The reading unit reads a first image on a first surface of a sheet and a second image on a second surface of the sheet and generate first and second image data from the first and second surfaces, respectively. The controller determines, based on the first and second image data, whether the first image is at a first edge of the first surface and the second image is at a second edge of the second surface of the sheet. The controller combines the first and second image data into combined image data corresponding to the first and second images if both the first image is at the first edge and the second image is at the second edge. The controller processes the combined image data such that a combined image corresponding to the combined image data has a predetermined size.

Hereinafter, embodiments of an image reading apparatus and an image reading program will be described with reference to the accompanying drawings.

First, an overall configuration of an image forming apparatus 100 that includes an image reading apparatus and/or an image reading program according to an embodiment will be described with reference to FIG. 1.

Figure 1:
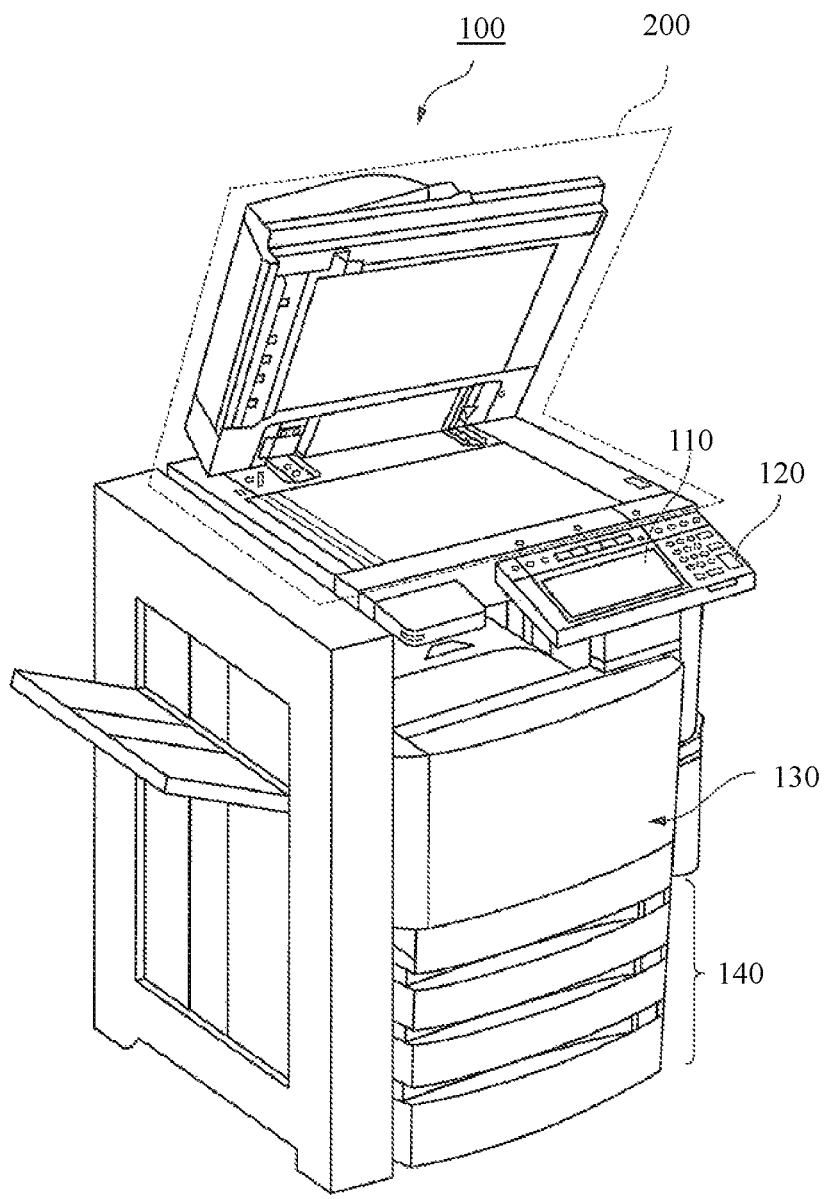
FIG. 1 depicts an image forming apparatus according to an embodiment.

FIG. 1 is an external view illustrating an overall configuration example of the image forming apparatus 100 according to one embodiment. The image forming apparatus 100 is, for example, a multifunction peripheral (MFP). The image forming apparatus 100 includes a display 110, a control panel 120, a printer unit 130, a sheet storage unit 140, and an image reading unit 200. The image forming apparatus 100 is an example of an image reading apparatus and may be a copier, a scanner, or the like.

The display 110 is, for example, an image display device such as a liquid crystal display (LCD) or an organic electro luminescence (EL) display. The display 110 displays various kinds of information related to the image forming apparatus 100. The display 110 and the control panel 120 may be configured as an integrated touch panel.

The control panel 120 is an example of an operation input unit. The control panel 120 includes a plurality of buttons. The control panel 120 receives a user input operation from a user. The control panel 120 outputs a signal corresponding to the input operation performed by the user to a controller (such as a control unit 101 shown in FIG. 2) of the image forming apparatus 100. For example, the input operation may be an instruction to combine image data generated by reading front and back surfaces of a sheet S in a case where the sheet S to be read is a folded sheet. The input operation may also indicate an instruction to start reading an image formed on the sheet S.

The printer unit 130 forms an image on the sheet S based on the image data generated by the image reading unit 200.

The printer unit 130 may be a device for fixing a visible image such as a toner image on the sheet S or may be an ink jet type apparatus. The sheet S is, for example, a paper, a label paper, or the like. The sheet S may be any material that allows the image forming apparatus 100 to form an image on a surface of the sheet S. The sheet S may be a sheet stored in the sheet storage unit 140 or may be a sheet manually inserted into the image forming apparatus 100.

The sheet storage unit 140 stores a sheet S to be used for image formation by the printer unit 130.

The image reading unit 200 such as a scanner or the like reads an image formed on the sheet S based on the brightness and darkness of the light and generates image data that is digital data. The image reading unit 200 records the generated image data in an auxiliary storage device 103. The image reading unit 200 may output the generated image data to the printer unit 130. The image reading unit 200 may output the generated image data to another information processing apparatus or the like via network.

Next, a functional configuration of the image forming apparatus 100 according to an embodiment will be described with reference to FIG. 2.

Figure 2:
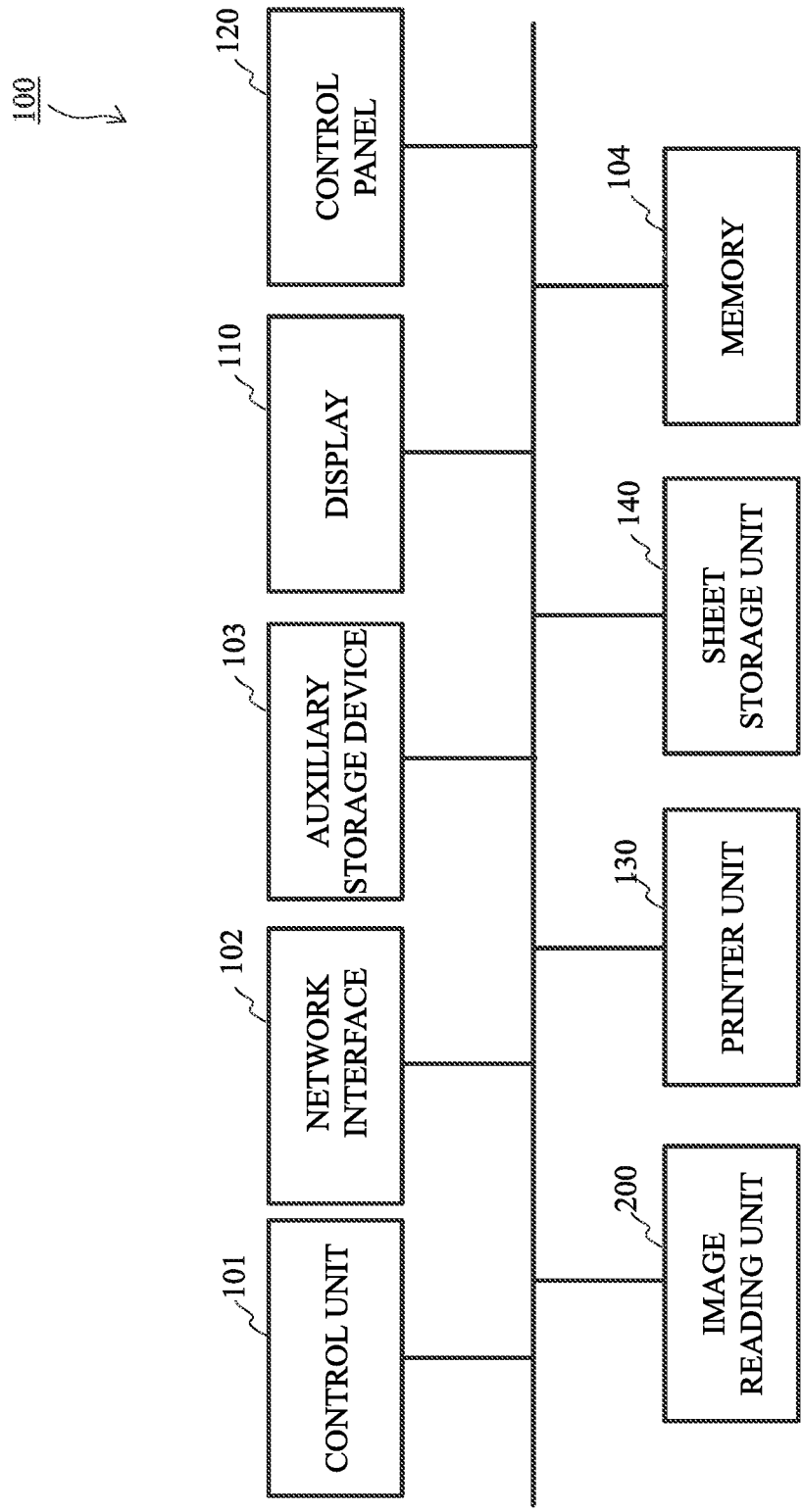
FIG. 2 is a block diagram of a functional configuration of an image forming apparatus according to an embodiment.

FIG. 2 is a block diagram illustrating a functional configuration of the image forming apparatus 100 according to one embodiment. The image forming apparatus 100 includes a control unit 101, a network interface 102, an auxiliary storage device 103, and a memory 104 as well as the display 110, the control panel 120, the printer unit 130, the sheet storage unit 140, and the image reading unit 200. The functional units included in the image forming apparatus 100 are connected to each other via an internal bus and are capable of inputting and outputting data to and from each other.

The control unit 101 controls the operation of each functional unit of the image forming apparatus 100. The control unit 101 executes a program (or programs), thereby causing each functional unit to execute various types of processing. The program is stored, for example, in the memory 104 in advance.

The network interface 102 transmits and receives data to and from an external device. The network interface 102 operates as an input interface and receives data transmitted from an external device. The network interface 102 operates as an output interface and transmits data to an external device.

The auxiliary storage device 103 is, for example, a storage medium such as a hard disk drive (HDD) or a solid-state drive (SSD). The auxiliary storage device 103 stores various types of data. The various types of data are, for example, image data and the like. The image data is, for example, digital data generated by the image reading unit 200.

The memory 104 is, for example, a storage medium such as a random-access memory (RAM). The memory 104 temporarily stores data and programs used by the respective functional units included in the image forming apparatus 100. The digital data (also referred to as image data) generated by the image reading unit 200 may be recorded in the memory 104 instead of the auxiliary storage device 103.

Next, a configuration of the image reading unit 200 according to an embodiment will be described with reference to FIG. 3.

Figure 3:
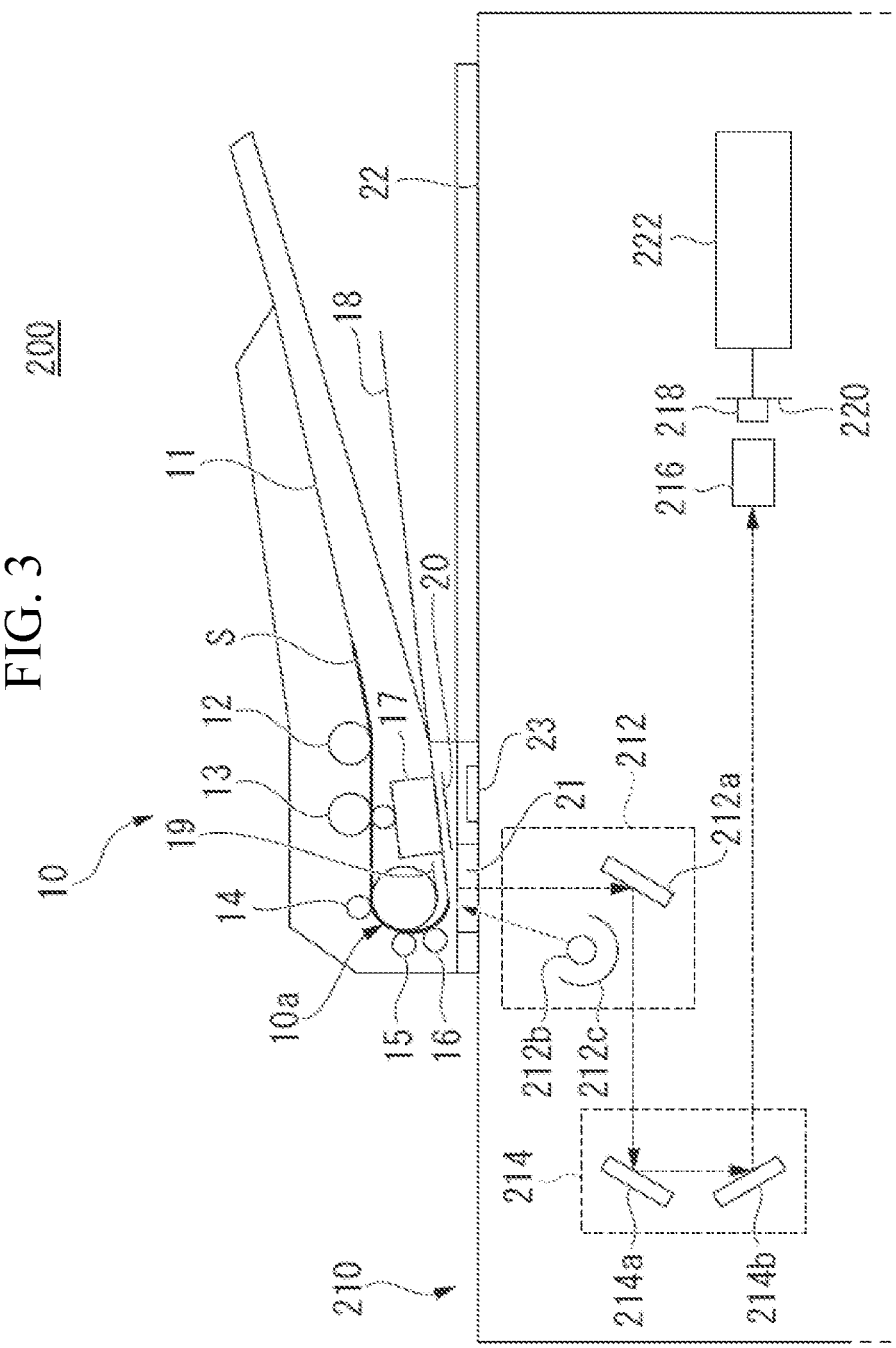
FIG. 3 depicts an image reading unit in a cross-sectional view according to an embodiment.

FIG. 3 is a cross-sectional view illustrating an example of a configuration of the image reading unit 200 according to one embodiment. In this embodiment, the image reading unit 200 is a double-sided reading type image reading apparatus that reads a first surface and a second surface of a sheet S. The image reading unit 200 reads the first surface of the sheet S by a first image reading unit 210. The image reading unit 200 reads the second surface, which is the back surface of the first surface of the sheet S, by a scanner module 17 (may also be referred to as a second image reading unit herein).

The image reading unit 200 includes the first image reading unit 210 and the scanner module 17. The image reading unit 200 includes an auto document feeder (ADF) 10. The ADF 10 conveys the sheet S to the first image reading unit 210 and the scanner module 17.

The ADF 10 includes a document tray 11, a conveyance mechanism, and a sheet discharge tray 18. The conveyance mechanism includes a pickup roller 12, a registration roller 13, and conveyance rollers 14, 15, and 16. The conveyance mechanism includes a drive unit that generates torque for rotating the pickup roller 12, the registration roller 13, the conveyance rollers 14, and 15, and 16. The drive unit is, for example, a motor, a solenoid, or the like.

A sheet S to be read by the first image reading unit 210 and the scanner module 17 is placed on the document tray 11. The pickup roller 12 takes the sheet S from the document tray 11 and feeds the sheet S toward a conveyance path. The registration roller 13 aligns a leading end position of the sheet S conveyed from the pickup roller 12 and sends the sheet S toward the conveyance rollers 14, 15, and 16. The conveyance rollers 14, 15, and 16 convey the sheet S conveyed from the registration roller 13 toward a reading window 21 and the scanner module 17. The sheet S first passes through an image reading range of the first image reading unit 210 and then passes through an image reading range of the scanner module 17. In an alternative embodiment, the sheet S may first pass through the image reading range of the scanner module 17 and then pass through the image reading range of the first image reading unit 210. Thereafter, the sheet S is discharged to the sheet discharge tray 18.

The first image reading unit 210 includes the reading window 21, a platen glass 22, and a white reference plate 23. The first image reading unit 210 also includes a first carriage 212, a second carriage 214, and a lens 216. Further, the first image reading unit 210 includes a charge coupled device (CCD) sensor 218, a CCD sensor substrate 220, and a control board 222.

In one embodiment, the first image reading unit 210 can be realized by an image scanner of a reduction optical system. In another embodiment, the first image reading unit 210 may be configured by an image scanner of an equal-magnification optical system using, for example, a contact image sensor (CIS). The first image reading unit 210 realized by the equal-magnification optical system can realize the same operation as that of the first image reading unit 210 of the reduction optical system.

The reading window 21 is an opening for reading an image of a sheet S conveyed by the ADF 10. The platen glass 22 is a document placing table on which a sheet S is placed.

The first carriage 212 includes a reflecting plate 212a, a light source 212b, and a reflector 212c. The light source 212b emits light. The light emitted from the light source 212b passes through the reading window 21 and is guided toward the conveyance path. The light reflected by the sheet S passes back through the reading window 21 and is guided to the reflecting plate 212a. The reflecting plate 212a reflects the incident light to the second carriage 214.

The second carriage 214 includes reflecting plates 214a and 214b. The reflecting plate 214a receives the light reflected by the reflecting plate 212 and reflects it toward the reflecting plate 214b. The reflecting plate 214b receives the light reflected by the reflecting plate 214a and reflects it toward the lens 216.

The lens 216 collects the light reflected by the reflecting plate 214b. The lens 216 forms condensed light on an imaging surface (that is a reading surface) of the CCD sensor 218.

The CCD sensor 218 is mounted on the CCD sensor substrate 220. For example, the CCD sensor 218 is a hybrid four-line sensor (4-channel). The hybrid four-line sensor includes a three-line sensor for reading a color image and a one-line sensor for reading a monochrome image. The three-line sensor reads light of R (red), G (green), and B (blue) color. The CCD sensor 218 converts the light imaged by the lens 216 into charge. By this conversion, the CCD sensor 218 converts the image formed by the lens 216 into an electric signal.

The CCD sensor 218 includes a plurality of image capturing elements arranged in a sub-scanning line direction. The sub-scanning line direction is a direction orthogonal to the conveyance direction of the sheet S by the ADF 10. The CCD sensor 218 outputs an electric signal based on a horizontal synchronization signal input from the control unit 101. The CCD sensor 218 outputs an electric signal generated by simultaneously reading by the plurality of image capturing elements as an electric signal for one line. When the next horizontal synchronization signal is input, the CCD sensor 218 reads an image for the next one line and outputs an electric signal. In this way, the CCD sensor 218 sequentially outputs electric signals for one line obtained by reading the sheet S in the sub-scanning line direction.

The CCD sensor substrate 220 generates image data based on the electric signals generated by photoelectric conversion of the CCD sensor 218.

The control board 222 controls the operation of the first carriage 212, the second carriage 214, and the CCD sensor substrate 220. For example, the control board 222 controls movement of the first carriage 212, turning-on and turning-off of the light source 212b of the first carriage 212, and the like.

The scanner module 17 has the same or substantially the same configuration as that of the first image reading unit 210. The scanner module 17 includes a light source and a CCD sensor. The CCD sensor includes a plurality of image capturing elements arranged in a sub-scanning line direction. The scanner module 17 guides the light emitted from the light source to the second surface of the sheet S. The scanner module 17 photoelectrically converts an optical signal into an electric signal based on reflected light from the sheet S and outputs image data. The scanner module 17 functions as the second image reading unit.

The scanner module 17 outputs an electric signal based on the horizontal synchronization signal input from the control unit 101. When the next horizontal synchronization signal is input, the scanner module 17 reads an image corresponding to the next one line and outputs an electric signal. In this way, the scanner module 17 sequentially outputs electrical signals for one line obtained by reading the sheet S in the sub-scanning line direction.

In the present embodiment, the CCD sensor 218 reads an image on the first surface (that is a front surface) of the sheet S being conveyed above the reading window 21. The scanner module 17 reads an image on the second surface (that is a back surface) of the sheet S. Accordingly, the image forming apparatus 100 conveys the sheet S along the conveyance path only one time and reads the images on both the first and second surfaces of the sheet S.

In ADF 10, a first light diffusing portion 19 is provided at a position where light from the light source 212b has passed through the reading window 21 and the conveyance path. The first light diffusing portion 19 is a light diffusing member. In other embodiments, the first light diffusing portion 19 may be any member that does not reflect the incident light. The first light diffusing portion 19 may be a member containing a material that absorbs the incident light. For example, the first light diffusing portion 19 is a black plate.

In a state where the sheet S is conveyed to the reading window 21, the light that has passed through the reading window 21 is reflected by the sheet S. In a state where the sheet S is not conveyed to the reading window 21, the light that has passed through the reading window 21 is diffused by the first light diffusing portion 19. As a result in the latter state, the light intensity in the CCD sensor 218 becomes higher than that in the former state.

In ADF 10, the scanner module 17 is provided downstream of the first image reading unit 210 in the conveyance direction. In another embodiment, the scanner module 17 may be provided upstream of the first image reading unit 210 in the conveyance direction. A second light diffusing portion 20 is provided at a position where light from a light source of the scanner module 17 has passed through the conveyance path. In a similar manner to the first light diffusing portion 19, the second light diffusing portion 20 diffuses the light emitted from the light source. Accordingly, the light intensity in the CCD sensor in a state where the sheet S is conveyed to the scanner module 17 is higher than the light intensity in a state where the sheet S is not being conveyed to the scanner module 17.

A sheet S may be placed on the document tray 11 by a user. The sheet S placed on the document tray 11 may be a sheet folded in two (or in half) or a sheet that is not folded. In the case where the image forming apparatus 100 is capable of reading a sheet S up to a predetermined maximum size such as A4, the image forming apparatus 100 cannot read an image formed on a sheet S having a larger size than A4 (such as A3 size). In such a case, for example, a user may fold the A3-size sheet S in two at a longitudinal folding line before placing it on the document tray 11. The image forming apparatus 100 of the present embodiment then reads images formed on first and second surfaces, which are A4-sized, of the folded sheet S and generates two pieces of image data corresponding to the two read images, respectively.

Figure 4A:
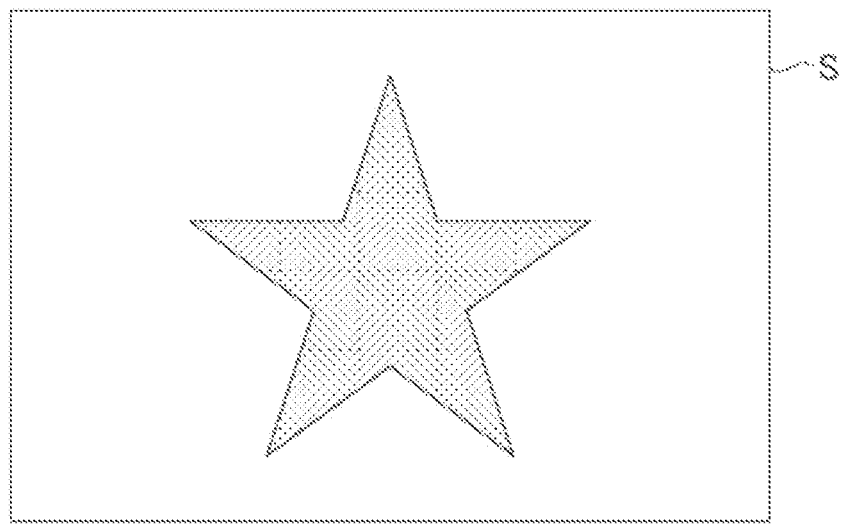
FIG. 4A and FIG. 4B depict example sheets according to an embodiment.
Figure 4B:
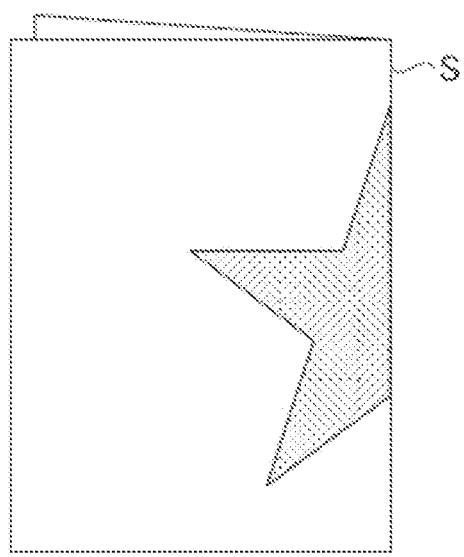

FIG. 4A and FIG. 4B depict an example of a sheet S before and after folding. The sheet S illustrated in FIG. 4A is a sheet having a size of A3. A star-shaped image is formed at and near the center of the sheet S. If a user wants the image forming apparatus 100 to read the A3-sized sheet S, the user must fold the sheet S in half such that its surface on which the image to be read is formed appears on the outside of the folding. FIG. 4B depicts the A4 sheet S folded from the A3 sheet S. The user places the folded sheet S on the document tray 11 of the image reading unit 200.

Figure 5:
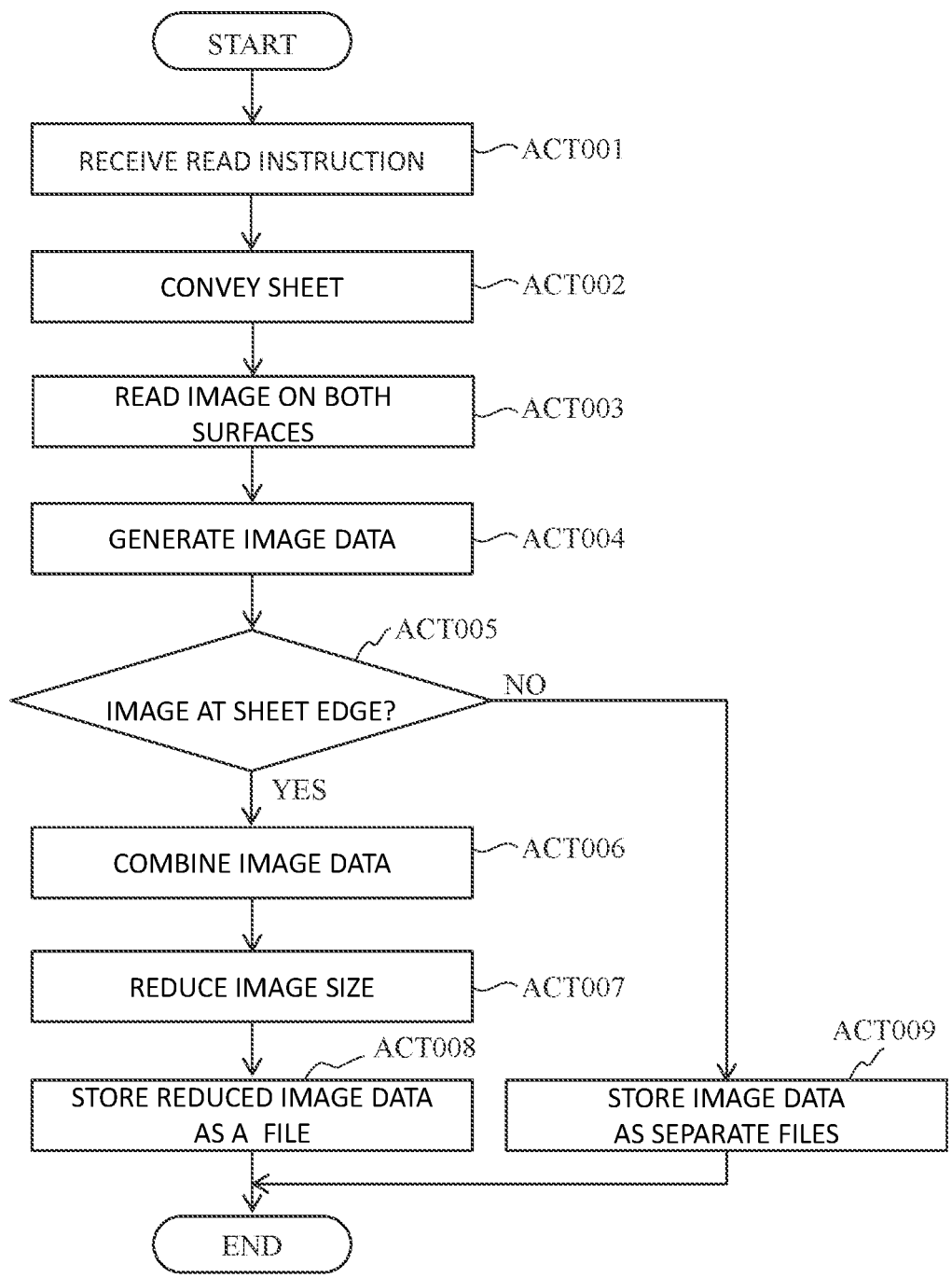
FIG. 5 is a flowchart of an operation of a control unit according to an embodiment.

FIG. 5 is a flowchart of an operation of the control unit 101 according to one embodiment. The flowchart starts when, for example, a user places a sheet S on the document tray 11 and enters input operation indicating a read instruction by the control panel 120. The read instruction here is an instruction for causing the image reading unit 200 to read an image formed on each of the first surface (or a front surface) and the second surface (or a back surface) of the folded sheet S. The read instruction may be an instruction for executing double-sided reading. The read instruction is generated, for example, by selecting a "double-side reading" icon displayed on the display 110 and pressing a "start" icon. The display 110 may be a touch panel. The generated read instruction is output to the control unit 101.

As shown in FIG. 5, first, the control unit 101 receives the read instruction output from the control panel 120 (ACT001). Next, the control unit 101 controls the drive unit of the conveyance mechanism to generate a torque for rotating the pickup roller 12, the registration roller 13, the conveyance rollers 14, 15, and 16. By controlling these rollers, the control unit 101 causes the sheet S placed on the document tray 11 to be conveyed toward the reading window 21 of the first image reading unit 210 and the scanner module 17 (that is the second image unit) (ACT002).

Next, the control unit 101 controls the first image reading unit 210 and the scanner module 17 to read images formed on both first and second surfaces of the sheet S (ACT003). In the present embodiment, the first image reading unit 210 reads the image on the first surface of the sheet S, and the scanner module 17 as the second image reading unit reads the image on the second surface of the sheet S. The control unit 101 further controls the first image reading unit 210 and the scanner module 17 to generate image data indicating the read images (ACT004). For example, when reading is performed on both first and second surfaces of the folded sheet S as shown in FIG. 4B, the image data (may also be referred to as the first image date herein) im1 and the image data (may also be referred to as the second image data herein) im2 are generated as illustrated in FIG. 6A.

Next, the control unit 101 determines whether the first image based on the first image data generated by the first image reading unit 210 exists along at least one edge of the first surface of the sheet S. The control unit 101 also determines whether the second image based on the second image data generated by the scanner module 17 exists along at least one edge of the second surface of the sheet S (ACT005).

Figure 6A:
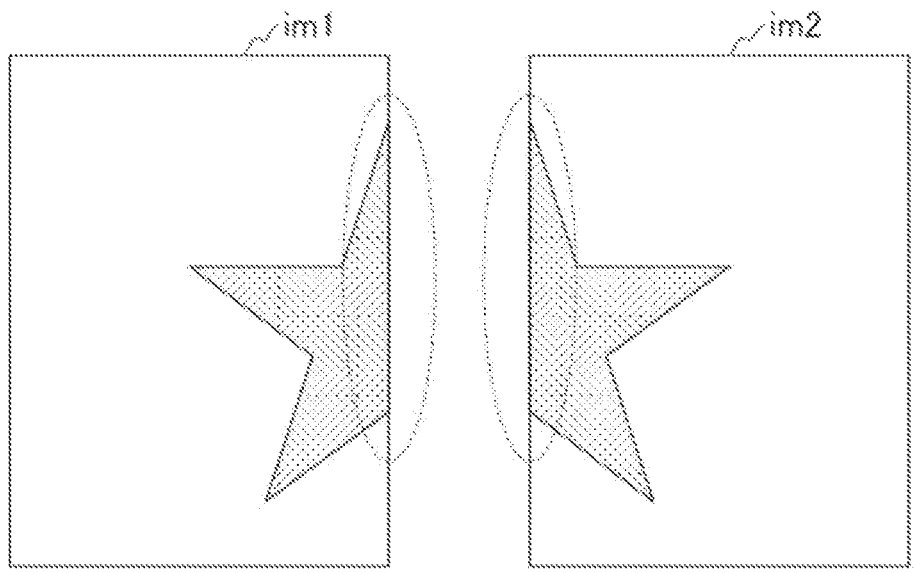
FIG. 6A and FIG. 6B depict example image data according to an embodiment.

For example, the image data im1 shown in FIG. 6A indicates that an image showing a left half of the original star image exists at a right side edge of the first surface of the sheet S. The image data im2 illustrated in FIG. 6A indicates that an image showing a right half of the original star image exists at a left side edge of the second surface of the sheet S. In this case, the control unit 101 determines that the first and second images based on the first and second image data generated by the first image reading unit 210 and the scanner module 17 exist at the respective edges of the first and second surfaces of the sheet S (ACT005).

If a sheet having at least one image (hereinafter may also be referred to as an original image) formed at and near the center of the sheet is folded in two, creating a pair of half-sized sheets, the original image appears extending between the first surface (that is the front surface) and the second surface (that is the back surface) of the folded sheet. In this case, at least part of the original image is present on an edge formed by folding the sheet at a longitudinal folding line crossing the sheet center. In contrast, in a non-folded sheet, there are many cases where no image appears along an edge of the sheet. In view of this, the control unit 101 of the image forming apparatus 100 according to the present embodiment is configured to determine that the sheet S is a folded sheet if at least part of an image is present on at least one edge of each of the first and second surfaces of the sheet S.

The control unit 101 may also determine that the sheet S is a folded sheet if at least part of an image is formed at each of the paired edges of the first and second surfaces of the sheet S. For example, in FIG. 6A, the image data im1 is a piece of image data generated by reading the first surface of the folded sheet S, and the image data im2 is a piece of image data generated by reading the second surface of the folded sheet S. The right side-edge of the first surface based on the image data im1 and the left side-edge of the second surface based on the image im2 are the edges generated by folding the sheet S in two (or in half). These edges corresponding to the folding lines of the sheet S constitute a pair of edges.

In the present embodiment, when each of the first surface and the second surface has at least one edge where an image exists, the control unit 101 may further determine whether the edges of the first and second surfaces are paired edges. In this way, the control unit 101 can determine, with greater accuracy, whether the sheet S to be read is a folded sheet.

The control unit 101 may also further analyze the first and second images that are present at the paired edges of the first and second surfaces. For example, the control unit 101 may analyze positions and luminance values of the images present at the respective edges and determine whether there is continuity in the respective images. If the control unit 101 determines that there is continuity in both images based on the analysis result, the control unit 101 determines that one image has been divided and has become two images. If the control unit 101 determines that the two images are obtained by dividing the one image, the control unit 101 determines that the sheet S is a folded sheet.

Figure 6B:
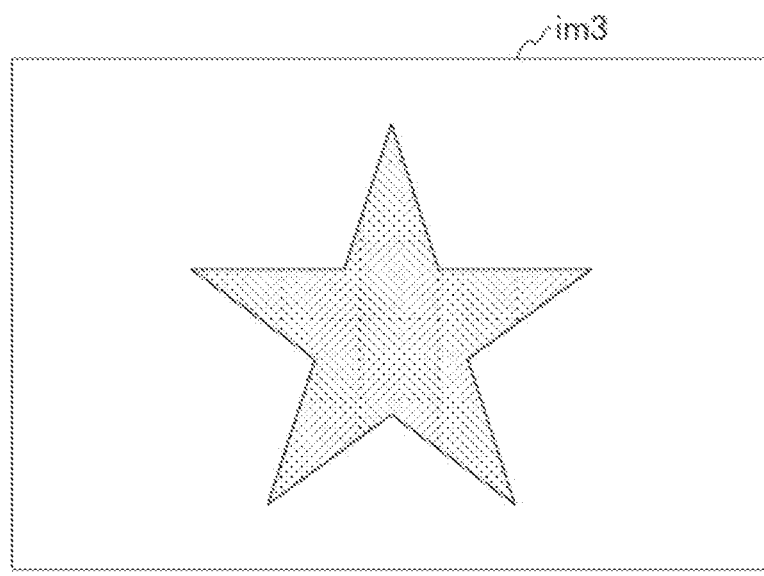

Next, if the control unit 101 determines that the images based on the first and second image data generated, respectively, by the first image reading unit 210 and the scanner module 17 exist along the respective edges of the first and second surfaces of the sheet S (YES in ACT005), the control unit 101 combines the first and second image data (ACT006). For example, when the image data generated by the first image reading unit 210 and the scanner module 17 are the image data im1 and the image data im2 as illustrated in FIG. 6A respectively, the image data im1 and the image data im2 are combined. The combined image data corresponds to the image data im3 illustrated in FIG. 6B. This way, the original image (that is the image in FIG. 4A) before the folding of the sheet S is restored.

Figure 7A:
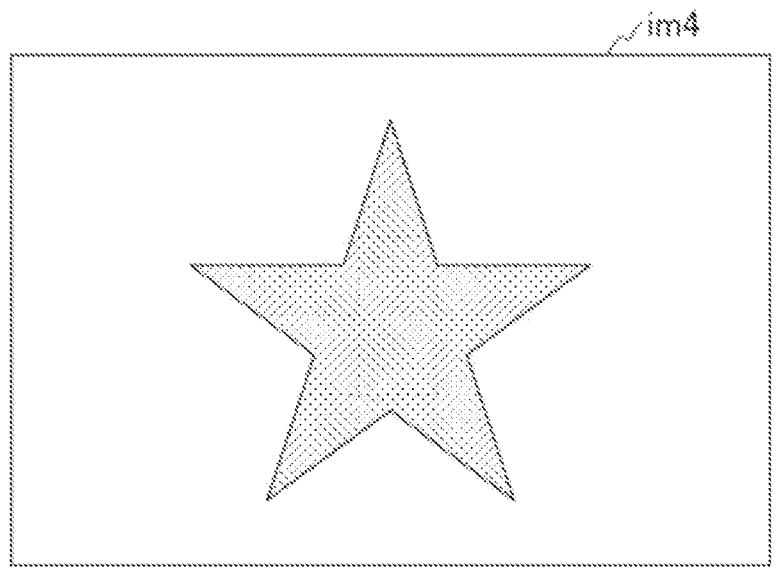
FIG. 7A and FIG. 7B depict example image data according to an embodiment.
Figure 7B:
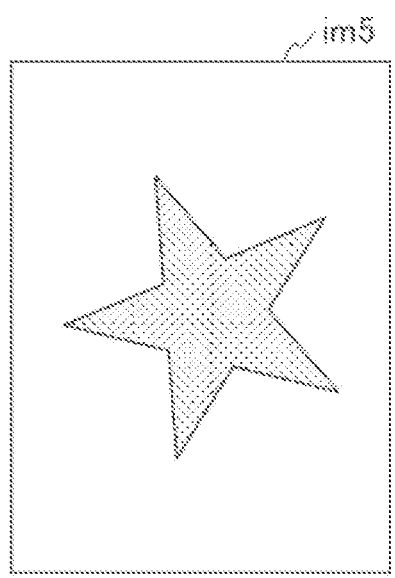

Next, the control unit 101 processes the combined image data to set the size of the combined image based on the combined image data to an arbitrary or predetermined size. In one embodiment, the control unit 101 processes the combined image data to reduce the size of the combined image to the arbitrary size (ACT007). For example, in the case where the combined image data is the image data im4 as shown in FIG. 7A, the image data im4 becomes the image data im5 as illustrated in FIG. 7B by processing the image data im4 for the image size reduction. In one instance, the image based on the image data im4 has a size that can be formed on a sheet S having an A3 size, and the image based on the image data im5 has a size that can be formed on a sheet S having an A4 size.

If the image forming apparatus 100 supports image formation on a sheet S up to the maximum A4 size, the control unit 101 reduces the size of the combined image such that the combined image fits on the sheet S of A4 size. This makes it unnecessary to perform an extra process of the image data during any subsequent image formation processing on an A4 sheet S, and thus the image forming apparatus 100 can perform the image formation processing more quickly.

Next, the control unit 101 converts the size-reduced image or the image data processed for image size reduction into a file and records the file in the auxiliary storage device 103 (ACT008).

In another embodiment, the control unit 101 may store the image data as a file in the auxiliary storage device 103 after performing conversion on the combined image data such that the combined image is enlarged to a predetermined size.

In the present embodiment, after the image data process for the image size reduction (ACT007), the control unit 101 may further process the image data to generate a rotated image and then convert it into a file for the data storing (ACT008). The image data im5 shown in FIG. 7B has been obtained by first processing the image data im4 shown in FIG. 7A to reduce the image size by half and by further processing the image data such that the image represented by the processed image data is rotated by 90 degrees in the counterclockwise direction. In this case, the control unit 101 can record/store, in the auxiliary storage device 103, the image data corresponding to an image formed on a standard sheet size or the like of a predetermined dimension (for example, a A4 size sheet). Accordingly, it will not be necessary later to perform any extra process on the image data when the stored image is printed onto a sheet S or the like, and thus the image forming apparatus 100 can perform the image formation processing (for example, printing) more quickly.

Referring back to FIG. 5, when the control unit 101 makes at least one of the following first and second determinations (ACT005, NO), the control unit 101 individually converts the first and second image data generated by the first image reading unit 210 and the scanner module 17 into separate files and records them in the auxiliary storage device 103 (ACT009). The first determination is: when the control unit 101 determines that the image based on the first image data generated by the first image reading unit 210 is not present at any edges of the first surface of the sheet S, the control unit 101 individually converts the first and second image data into separate files. The second determination is: when the control unit 101 determines that the image based on the second image data generated by the scanner module 17 does not exist at any edges of the second surface of the sheet S, the control unit 101 individually converts the first and second image data into separate files.

Figure 8A:
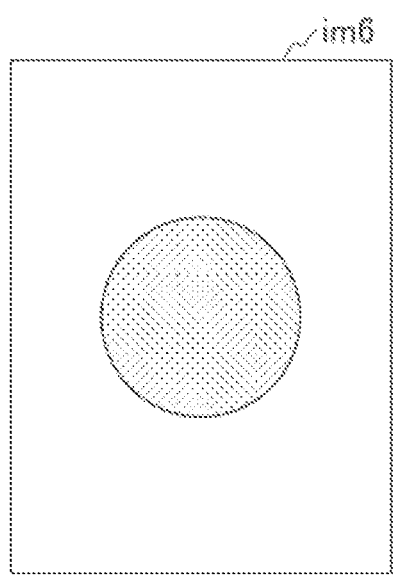
FIG. 8A and FIG. 8B depict example image data according to an embodiment.
Figure 8B:
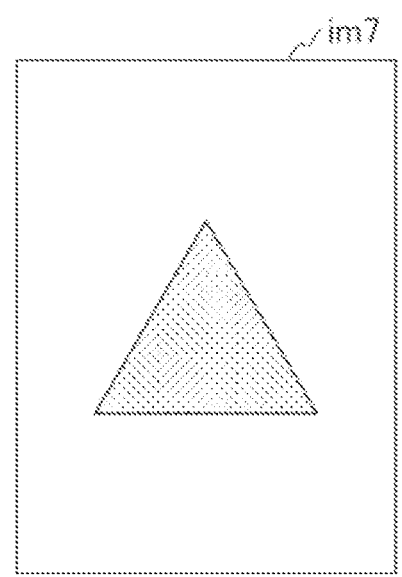

FIG. 8A and FIG. 8B show example image data im6 and im7 generated by the first image reading unit 210 and the scanner module 17, respectively. The image data im6 represents an image of a first surface (the front surface in this example) of the sheet S. The image data im7 represents an image of a second surface (the back surface in this example) of the same sheet S. The image corresponding to the image data im6 does not exist at any edges of the first surface of the sheet S. The image corresponding to the image data im7 does not exist at any edges of the second surface of the sheet S. Therefore, the control unit 101 determines that the sheet S is not a folded sheet. The control unit 101 then individually converts the image data im6 and the image data im7 into two separate files and records the files in the auxiliary storage device 103.

While, in one embodiment, the image forming apparatus 100 records the image file(s) in a recording medium such as the auxiliary storage device 103 in a similar manner to a scanner, the image forming apparatus 100 according to another embodiment may be configured to print the image based on the image file(s) on another sheet S in a similar manner to a copy machine.

In one embodiment, the processes in ACT005 to ACT007 in the flowchart shown in FIG. 5 may be performed only when an instruction is issued by a user in advance. In one instance, the control unit 101 may perform the determination process of whether or not a sheet S to be read is a folded sheet (ACT005) only when an instruction by a user is issued and sent to the control unit 101 in advance. In another instance, if the control unit 101 has determined that the sheet S to be read is a folded sheet (ACT005 YES), the control unit 101 may perform the process of combining the image data (ACT006) as well as the following process (ACT007) only when an instruction by a user is issued and sent to the control unit 101 in advance.

In one embodiment, for example, a user operates the control panel 120 to input the instruction for combining two pieces of image data generated by reading both surfaces of the sheet S in a case where the sheet S is a folded sheet. Then, the user further operates the control panel 120 and inputs a read instruction or an instruction to perform copying. When the read instruction has been sent to the control unit 101, the control unit 101 operates in accordance with the flowchart illustrated in FIG. 5.

If a user inputs only the read instruction without the instruction for image data combination, the control unit 101 may operate as if the determination in ACT005 is always "NO" and proceed to individually convert two pieces of image data (the first and second image data) generated by reading both surfaces (the first and second surfaces) of the sheet S into separate files and records the files in the auxiliary storage device 103 (ACT009). With such a configuration, for example, in a case where it is known in advance that no folded sheet exists among a plurality of sheets S to be read, the control unit 101 does not need to execute unnecessary processes, thereby saving time for reading images on the sheets S and reducing power consumption of the image forming apparatus 100.

In one embodiment, the image forming apparatus 100 may comprise a double feed detection unit having a double feed detection function of a sheet S. The double feed detection unit may be configured to detect an error that a plurality of sheets S are transported in a state where the sheets S erroneously overlap with one another. The double feed detection unit may be configured to detect, as a double feed, a case where a sheet S which has been folded in two are being conveyed from the document tray 11.

The double feed detection unit may be provided as part of or in the sheet conveyance mechanism. The double feed detection unit may include one or more double feed detection sensors each configured to detect whether a sheet S is being double fed from the document tray 11. As each of the double feed detection sensors, for example, a sensor for detecting a thickness of a sheet S may be used. Examples of the sensor include, but not limited to, an ultrasonic sensor capable of detecting a sheet thickness. The double feed detection unit or the double feed detection sensor thereof may be configured to detect whether the sheet S is double fed at least before the sheet S is conveyed to the reading window 21 of the first image reading unit 210. Information indicating a detection result is delivered to the control unit 101 via an internal bus.

In a case where the double feed detection sensor detects a thickness of a sheet S being fed from the document tray 11, information about the detected sheet thickness is stored in the memory 104 or the like. A predetermined threshold of sheet thickness is also stored in the memory 104 or the like. In such a case, the control unit 101 determines that the sheet S has been conveyed in a double feed state when the detected thickness exceeds the predetermined thickness threshold. Therefore, a double feed is determined not only in a case where the double feed has actually occurred, but also in a case where a folded sheet is conveyed.

Figure 9:
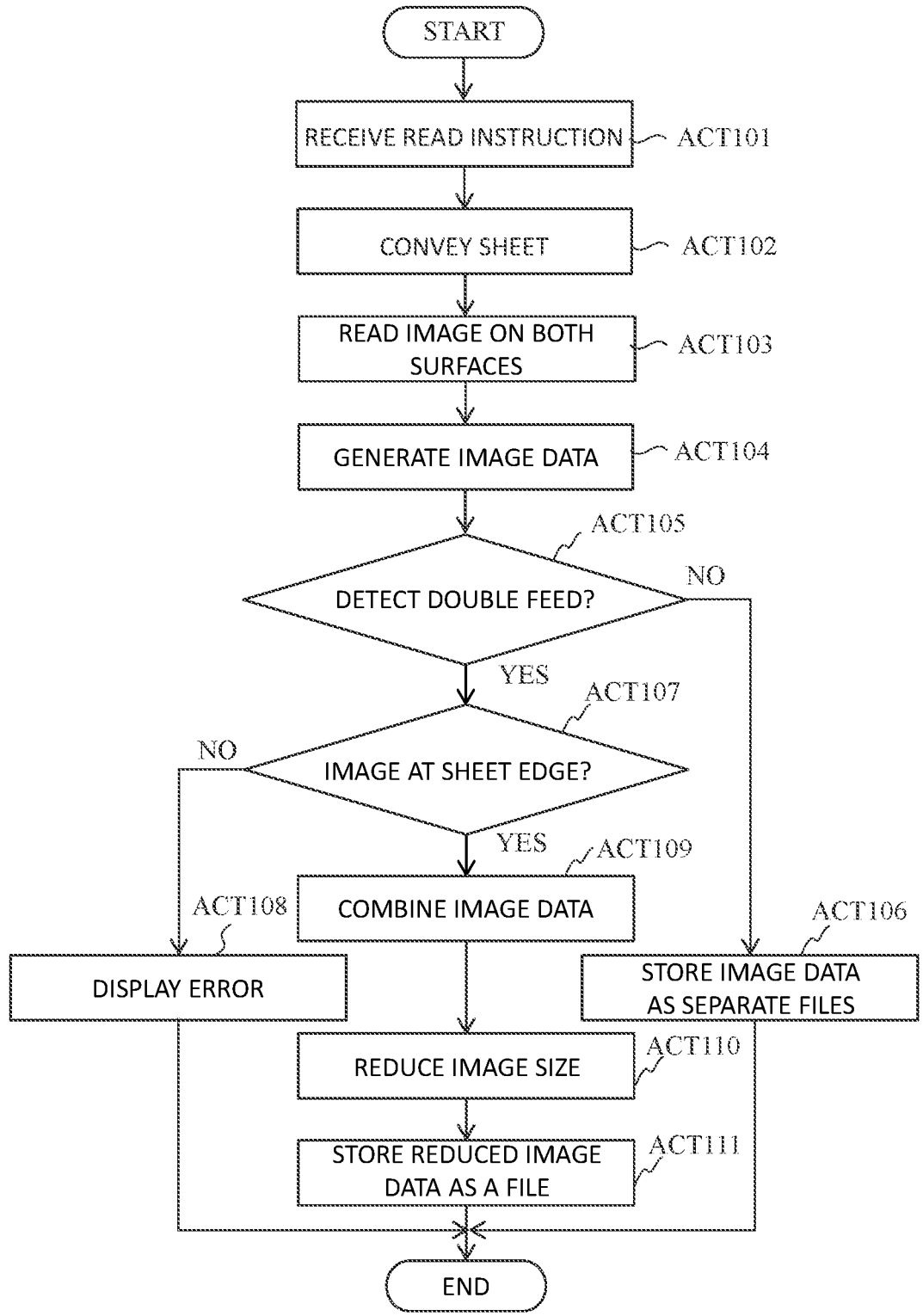
FIG. 9 is a flowchart of an operation of a control unit according to an embodiment.

FIG. 9 is a flowchart of an operation of the control unit 101 according to one embodiment utilizing the double feed detection. The flowchart begins when, for example, a user places a sheet S on the document tray 11 and performs an input operation indicating a read instruction by the control panel 120.

First, the control unit 101 receives the read instruction from the control panel 120 (ACT101). The control unit 101 then controls the drive unit of the conveyance mechanism to generate a torque for rotating the pickup roller 12, the registration roller 13, the conveyance rollers 14, 15, and 16, thereby causing the sheet S placed on the document tray 11 to be conveyed toward the reading window 21 of the first image reading unit 210 and the scanner module 17 (ACT102).

Next, the control unit 101 controls the first image reading unit 210 and the scanner module 17 to read the images formed on both the first surface and the second surface of the sheet S (ACT103). The control unit 101 then controls the first image reading unit 210 and the scanner module 17 to generate first and second image data indicating the respective read images (ACT104).

Next, the control unit 101 controls the double feed detection unit to detect whether a double feed of the sheet S has occurred (ACT105). When the double feed is not detected (No in ACT105), the control unit 101 individually converts the first and second image data into two separate image files and records the generated image files in the auxiliary storage device 103 (ACT106). When the control unit 101 determines that double feed has not occurred, the control unit 101 determines that the conveyed sheet S is a non-folded sheet.

When the double feed is detected (Yes in ACT105), the control unit 101 determines whether the image based on the first image data generated by the first image reading unit 210 exists along at least one edge of the first surface of the sheet S. The control unit 101 also determines whether the image based on the second image data generated by the scanner module 17 exists along at least one edge of the second surface of the sheet S (ACT107).

Next, when the control unit 101 makes at least one of the following first and second determinations (ACT107, NO), the control unit 101 controls the control panel 120 and causes the display 110 to display information such as an error message indicating that a double feed has occurred (ACT108). The first determination is: when the control unit 101 determines that the image based on the first image data generated by the first image reading unit 210 does not exist at any edges of the first surface of the sheet S, the control unit 101 causes the display 110 to display information indicating that a double feed has occurred. The second determination is: when the control unit 101 determines that the image based on the second image data generated by the scanner module 17 does not exist at any edges of the second surface of the sheet S, the control unit 101 causes the display 110 to display information indicating that a double feed has occurred.

As an alternative to or in addition to the display notification to the user, the control unit 101 may notify the user by causing a speaker to generate a specific sound such as an error sound. In either case, the control unit 101 may stop the operation of each functional unit of the image forming apparatus 100.

If the double feed detection sensor of the double feed detection unit detects a double feed and if the control unit 101 determines that the sheet S is not a folded sheet, the control unit 101 determines that a double feed has actually occurred.

If the control unit 101 determines that each of the images based on the first and second image data generated by the first image reader 210 and the scanner module 17 exists along at least one edge of each of the first and second surfaces of the sheet S (YES in ACT107), the control unit 101 combines the first image data with the second image data (ACT109).

If the double feed detection sensor of the double feed detection unit detects a double feed and if the control unit 101 determines that each of the images based on the first and second image data generated by the first image reader 210 and the scanner module 17 exists along at least one edge of each of the first and second surfaces of the sheet S, the control unit 101 determines that the read sheet S is a folded sheet and that it is not a double feed.

Next, the control unit 101 processes the combined image data to set the size of the combined image based on the combined image data to an arbitrary size. In one embodiment, the control unit 101 processes the combined image data to reduce the size of the combined image to the arbitrary size (ACT110). This image data process for image size reduction is done in a similar manner to the corresponding process in the flowchart of FIG. 5.

Finally, the control unit 101 converts the size-reduced image or the image data processed for the image size reduction into a file and records the file in the auxiliary storage device 103 (ACT111).

In one embodiment, the control panel 120 may be configured to accept a user's input operation to instruct the image forming apparatus 100 to disable the double feed detection function. If such an instruction is received, the control unit 101 performs ACT106 without performing ACT108 and ACT111.

If it is necessary to read both sides of a sheet S that exceeds the maximum size that the image forming apparatus 100 can read, the image forming process may be performed as in the following, in one example case where a sheet S has an image as illustrated in FIG. 10A on one side and an image (or images) as illustrated in FIG. 10B formed on the other side.

First, a user can fold the sheet S in two halves as shown in FIG. 10C. In this example, the sheet S has a star-shaped image overlapping the center of a first side of the sheet S as illustrated in FIG. 10A, whereas an image is not formed overlapping the center of a second side of the sheet S as illustrated in FIG. 10B. The user first folds the sheet S such that the first side faces outward after the folding as shown in FIG. 10C and then places the sheet S on the document tray 11. Then, the user causes the image forming apparatus 100 to read both outer facing surfaces of the first folded sheet S. After this, the user next unfolds, then re-folds the sheet S as shown in FIG. 10D such that the second side faces outward after the re-folding and places the re-folded sheet S on the document tray. Then, the user causes the image forming apparatus 100 to read each side of the re-folded sheet S.

Following the respective processes in the flowchart of FIG. 5, the control unit 101 determines that the folded sheet S of FIG. 10C is a folded sheet. This is because the image exists along the corresponding or paired edges of both sides of the folded front surface of the sheet S. The image forming apparatus 100 generates two pieces of image data respectively corresponding to a half piece of the image on one side of the folded front surface of the sheet S and another half piece of the image on another side of the folded front surface of the sheet S. The image forming apparatus 100 subsequently combines the two pieces of image date into one piece of image data and converts it to one image file, which is then stored in the auxiliary storage device 103.

On the other hand, the control unit 101 determines that the re-folded sheet S of FIG. 10D is not a folded sheet because no image is present at any edges of each side of the folded back surface of the sheet S. As a result, even though the sheet S is actually a folded sheet, the control unit 100 will recognize the sheet S as an unfolded sheet and individually converts the two pieces of image data, which have been generated by reading both sides of the folded back surface of the sheet S, into two separate image files without performing the image data combining process.

However, when the image forming apparatus 100 reads the front and back surfaces of an oversized sheet S one right after another, that is, the image forming apparatus 100 reads a sheet S that exceeds the maximum readable size for the image forming apparatus 100, the image forming apparatus can be setup to know that the odd-numbered readings are to be followed directly by an even-numbered reading such that even-numbered reading following an odd-numbered reading are considered to be parts of the same side of the unfolded (full size) sheet S.

For this reason, when the control unit 101 determines that folded sheets S are being read, the control unit 101 may be configured to automatically determine that images from consecutive readings of sheet S should be combined into a single image. In that case, the control unit 101 may omit processing for the determination of whether consecutive read sheets S are part of a folded sheet.

Referring back to FIG. 3, while the image reading unit 200 of the image forming apparatus 100 includes the ADF 10 according to one embodiment, the configuration is not limited to this. For example, the image reading unit 200 may be a flat-bed scanner. In this case, after the image reading unit 200 reads the first surface or the front side of the sheet S, the sheet S may be flipped to a back side on a document placing table such as the platen glass 22 by a user, and then the image reading unit 200 reads the second surface or the back side of the sheet S.

According to one or more embodiments, the image forming apparatus 100 reads images formed on first and second surfaces of the sheet S by the image reading unit 200 and generates two pieces of image data respectively corresponding to the images on the first and second surfaces of the sheet S. Then, the image forming apparatus 100 determines whether an image is present on at least one edge of each of the first and second surfaces of the sheet S by the control unit 101. If the image forming apparatus 100 determines that the image is present on at least one edge of each of the first and second surfaces of the sheet S, the image forming apparatus 100 combines the two pieces of image data and processes the combined image data such that a size of the image based on the combined image data is set to an arbitrary or predetermined size.

Accordingly, the image forming apparatus 100 can determine whether the sheet S to be read is a folded sheet, and once it is determined that the sheet S to be read is a folded sheet, the image forming apparatus 100 performs the image data combining process, thereby generating image data that represents the original image, that is the image formed on the sheet S before being folded.

According to the image forming apparatus 100 of at least one of the above-described embodiments, it is not necessary to specify by manual user input whether each sheet is a part of folded sheet, and thus it is possible to further improve convenience and efficiency in image reading.

The functions of the image forming apparatus 100 according to the one or more present embodiments may be realized by a computer or a computer system (hereinafter collectively referred to as a computer system). In this case, a program or programs (hereinafter collectively referred to as a program) for realizing such functions may be recorded in a non-transitory computer-readable recording medium, and the program recorded in the recording medium may be read into the computer system and executed by the computer system. The "computer system" herein includes, but not limited to, hardware such as an OS, a peripheral device, and a peripheral device. The "computer-readable recording medium" includes, but not limited to, a portable medium such as a flexible disk, a magneto-optical disk, a ROM, or a CD-ROM, and a storage device such as a hard disk built in the computer system. A program can be transmitted via a network such as the Internet or a communication line such as a telephone line, and/or stored by a server, cloud-based storage, or the like. The program may be a program for realizing at least a part of the functions of the image forming apparatus 100 or may be a program for realizing the functions of the image forming apparatus 100 in combination with a program already stored in the computer system.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The embodiments and modifications thereof are included in the scope and spirit of the invention, and are included in the invention described in the claims and the equivalent scope thereof.

What is claimed:

1. An image reading apparatus, comprising:
   a reading unit configured to read a first image on a first surface of a sheet and a second image on a second surface of the sheet and generate first and second image data from the first and second surfaces, respectively; and
   a controller configured to:
      determine whether a double feed of the sheet has been detected;
      determine, based on the first and second image data, whether the first image is at a first edge of the first surface and the second image is at a second edge of the second surface of the sheet only if the double feed of the sheet has been detected;
      if the double feed of the sheet has been detected, combine the first and second image data into combined image data corresponding to the first and second images when both the first image is at the first edge and the second image is at the second edge; and process the combined image data such that a combined image corresponding to the combined image data has a predetermined size.

2. The image reading apparatus according to claim 1, wherein the predetermined size is less than an initial size of the combined image.

3. The image reading apparatus according to claim 1, wherein the predetermined size fits on a standard sheet size that is smaller than a sheet size of the sheet.

4. The image reading apparatus according to claim 1, wherein the combined image aligns the first and second images to match the first and second edges.

5. The image reading apparatus according to claim 1, wherein the controller is further configured to process the combined image data to rotate the combined image.

6. The image reading apparatus according to claim 1, further comprising:
a detection unit configured to detect the double feed of the sheet, wherein
the controller determines whether the double feed of the sheet has been detected based on output of the detection unit.

7. The image reading apparatus according to claim 1, further comprising:
an operation input unit configured to receive an input operation from a user, wherein
the controller performs the determination of whether the first and second images are present at the first and second edges only if the input operation is received.

8. The image reading apparatus according to claim 1, wherein the controller is further configured to consider an odd-numbered reading of the sheet followed directly by an even-numbered reading to be consecutive readings.

9. The image reading apparatus according to claim 8, wherein the controller is further configured to automatically determine that images from the consecutive readings are to be combined into a single image by combining the first and second image data into the combined image data.

10. An image reading apparatus, comprising:
a reading unit configured to read images on first and second sides of a sheet and generate separate image data for both the first and second sides of the sheet;
a detection unit configured to detect a double feed of the sheet; and
a controller configured to:
determine whether the double feed of the sheet has been detected based on output from the detection unit;
determine, based on the generated image data, whether at least part of each of the read images is at a respective edge of each of the first and second sides of the sheet only if the double feed of the sheet has been detected;
if the double feed of the sheet has been detected, combine the image data to generate combined image data corresponding to the read images for both first and second sides of the sheet when it is determined that at least part of each of the read images at the respective edge of each of the first and second sides of the sheet; and
process the combined image data such that a combined image corresponding to combined image data has a predetermined size.

11. A non-transitory computer-readable medium storing a program therein, which when executed, causes a computer to perform a process comprising:
reading a first image on a first surface of a sheet and a second image on a second surface of the sheet and generating first and second image data from the first and second surfaces, respectively;
detecting a double feed of the sheet;
determining, based on the first and second image data, whether the first image is at a first edge of the first surface and the second image is at a second edge of the second surface of the sheet only if the double feed of the sheet has been detected;
if the double fee of the sheet has been detected, combining the first and second image data into combined image data corresponding to the first and second images when both the first image is at the first edge and the second image is at the second edge; and
processing the combined image data such that a combined image corresponding to the combined image data has a predetermined size.

12. The non-transitory computer-readable medium according to claim 11, wherein the predetermined size is less than an initial size of the combined image.

13. The non-transitory computer-readable medium according to claim 11, wherein the predetermined size fits on a standard sheet size that is smaller than a sheet size of the sheet.

14. The non-transitory computer-readable medium according to claim 11, the process further comprising:
receiving a user input operation, wherein
the determination of whether the first and second images are at the first and second edges is performed only if the user input operation is received.

15. The non-transitory computer-readable medium according to claim 11, the process further comprising:
automatically determining that images from a consecutive pair of readings are to be combined into a single image by combining the first and second image data into the combined image data.

* * * * *